United States Patent
Rawat et al.

(10) Patent No.: US 6,662,340 B2
(45) Date of Patent: Dec. 9, 2003

(54) CLIENT-SIDE FORM FILLER THAT POPULATES FORM FIELDS BASED ON ANALYZING VISIBLE FIELD LABELS AND VISIBLE DISPLAY FORMAT HINTS WITHOUT PREVIOUS EXAMINATION OR MAPPING OF THE FORM

(75) Inventors: Jai Rawat, Sunnyvale, CA (US); Ajoy Kumar Bhatia, Fremont, CA (US); Vasileios Bill Zissimopoulos, San Francisco, CA (US)

(73) Assignee: America Online, Incorporated, Dulles, VA (US)

( * ) Notice: Subject to any disclaimer, the term of this patent is extended or adjusted under 35 U.S.C. 154(b) by 0 days.

(21) Appl. No.: 10/160,671

(22) Filed: May 30, 2002

(65) Prior Publication Data

US 2002/0156846 A1 Oct. 24, 2002

Related U.S. Application Data

(63) Continuation-in-part of application No. 09/561,449, filed on Apr. 28, 2000.

(51) Int. Cl.$^7$ ................................................ G06F 15/00
(52) U.S. Cl. ...................... 715/507; 715/508; 709/203; 709/212; 705/26; 705/34; 705/37
(58) Field of Search ................................. 709/203, 219; 705/26, 34, 37; 715/507, 508

(56) References Cited

U.S. PATENT DOCUMENTS

| | | | |
|---|---|---|---|
| 5,619,635 A | 4/1997 | Millman et al. | ............. 395/768 |
| 5,642,522 A | * 6/1997 | Zaenen et al. | ............... 715/532 |
| 5,794,259 A | * 8/1998 | Kikinis | ........................ 715/507 |
| 5,815,657 A | 9/1998 | Williams et al. | ............. 395/186 |
| 5,899,980 A | 5/1999 | Wilf et al. | ..................... 705/26 |
| 5,960,411 A | 9/1999 | Hartman et al. | ............... 705/26 |

(List continued on next page.)

FOREIGN PATENT DOCUMENTS

| | | | |
|---|---|---|---|
| EP | 585 073 | 3/1994 | .......... H04N/1/387 |
| EP | 585 074 | 3/1994 | .......... G06F/15/72 |
| EP | 917 119 | 5/1999 | .......... G07F/19/00 |
| EP | 917 120 | 5/1999 | .......... G07F/19/00 |
| EP | 949 595 | 10/1999 | ............. G07F/7/10 |
| EP | 1 077 419 | 2/2001 | .......... G06F/17/60 |
| EP | 1 085 443 | 3/2001 | .......... G06F/17/60 |
| EP | 1 168 264 | 1/2002 | .......... G07F/19/00 |
| EP | 1 170 926 | 1/2002 | .......... H04L/29/06 |
| WO | WO 00/52900 | 9/2000 | .......... H04L/29/06 |
| WO | WO 01/39031 | 5/2001 | .......... G06F/17/00 |
| WO | WO 01/45022 | 6/2001 | .......... G06F/17/60 |

OTHER PUBLICATIONS

*Gator information*; www.gator.com/about/; and www.gator.com, Dec. 2001.

(List continued on next page.)

*Primary Examiner*—Nabil El-Hady
(74) *Attorney, Agent, or Firm*—Glenn Patent Group; Michael A. Glenn; Christopher Peil (57) ABSTRACT

Client side program code examines electronic documents such as web pages and automatically fills out fields of forms contained in the document with the appropriate data from a user profile, without requiring prior mapping or examination of the form. The application maps user data to the appropriate form field by examining label text on the form as the user sees it, i.e. text that is visually nearest the field. For fields lacking labels, the application examines the field context to determine the required data. To enter the information in the correct format, the application parses visual hints concerning, for example, the date format provided to the user and formats the data accordingly. In the absence of any usable visual cues or contextual information, the program code parses the form's underlying markup code.

61 Claims, 3 Drawing Sheets

U.S. PATENT DOCUMENTS

| | | | | |
|---|---|---|---|---|
| 6,016,484 | A | | 1/2000 | Williams et al. ............... 705/39 |
| 6,028,938 | A | | 2/2000 | Malkin et al. ................ 380/25 |
| 6,101,482 | A | | 8/2000 | DiAngelo et al. ............ 705/26 |
| 6,105,008 | A | | 8/2000 | Davis et al. .................. 705/41 |
| 6,192,380 | B1 | | 2/2001 | Light et al. ................. 707/505 |
| 6,199,079 | B1 | | 3/2001 | Gupta et al. ................ 707/507 |
| 6,199,762 | B1 | | 3/2001 | Hohle ......................... 235/492 |
| 6,236,972 | B1 | | 5/2001 | Shkedy ........................... 705/1 |
| 6,260,024 | B1 | | 7/2001 | Shkedy ......................... 705/37 |
| 6,282,522 | B1 | | 8/2001 | Davis et al. .................. 705/41 |
| 6,304,915 | B1 | | 10/2001 | Nguyen et al. ............. 709/250 |
| 6,341,353 | B1 | | 1/2002 | Herman et al. ............. 713/201 |
| 6,345,256 | B1 | | 2/2002 | Milsted et al. ................. 705/1 |
| 6,421,693 | B1 | * | 7/2002 | Nishiyama et al. .......... 715/507 |
| 6,499,041 | B1 | * | 12/2002 | Breslau et al. .............. 715/505 |
| 6,499,042 | B1 | * | 12/2002 | Markus ....................... 715/507 |
| 2001/0027439 | A1 | * | 10/2001 | Holtzman et al. ............ 705/39 |
| 2002/0013788 | A1 | * | 1/2002 | Pennell et al. .............. 707/507 |
| 2002/0032699 | A1 | * | 3/2002 | Edwards et al. ............ 707/513 |
| 2002/0178062 | A1 | * | 11/2002 | Wright et al. ................. 705/17 |

OTHER PUBLICATIONS

*MicroSoft .Net Passport*; www.passport.com/Consumer/default.asp?1c=1033:, 2002.

*RoboForm: User Manual*; www.roboform.com/manual.html, Jan. 2002.

*MicroSoft Passport* ; C.E. Rider; E–Business Strategies & Solutions; Dec. 1999.

*Form Management in the Vicomte Workflow System*; Daniel K.C. Chan, Jan. 1999.

*A Layered Architecture for Querying Dynamic Web Content*; Hasan Davulca, Juliana Freire, Michale Kifer, and I.V. Ramakrishnan, 1999.

*WebWriter: A Browser–Based Editor for Constructing Web Applications*; Arturo Crespo, and Eric A. Bier; Fifth International World Wide Web Conference; May 6–10, 1996.

*Microchip Cards–Still a Wide Open Field*; Elettronica Oggi; Jun. 2001.

*Selling Insurance: Alternative Delivery Powers Banks Strategy*; Bank Systems + Technology; Dec. 1998.

*Open Transnational System for Digital Currency Payments*; S.F. Mjolsnes, and R. Michelsen; Proceedings of the Thirtieth Hawaii International Conference on System Sciences; Jan. 7–10, 1997.

*Numbers Can Be a Better Form of Cash Than Paper*; D. Chaum; Smart Card 2000. Selected Papers from the Second International Smart Card 2000 Conference; Oct. 4–6, 1989.

*Drexon Optical Storage for Digital Picture Archiving Applications*; J. Drexler; Proceedings of the Second International Conference and Workshop on Picture Archiving and Commmunication Systems; May 22–25, 1983. European Patent Application No. EP.

* cited by examiner

*100*

| Please follow these 5 quick steps to register for Quick Checkout, then click "Continue". | |
|---|---|
| ① Enter your credit card information.<br><br>Credit Card Nickname [   ]<br>(e.g. my Visa)<br>Credit Card Type [Visa ▼]<br>Credit Card Number [   ]<br>(e.g. 1234 5678 1234 0000 for Visa)<br>Expiration Date [5 ▼] / [2002 ▼]<br>First Name and Middle Initial [   ]<br>*102* — Last Name [   ]<br>Address Line 1 [   ]<br>Address Line 2 (optional) [   ]<br>Address Line 3 (optional) [   ]<br>City [   ]<br>State [AA - Armed Forces Americas ▼]<br>Zip/Postal [   ]<br>Country [United States ▼]<br>Daytime Phone [   ]<br>*103* — (e.g. 888-888-8888)<br>Evening Phone (optional) [   ]<br>(e.g. 888-888-8888) | Remember<br>At checkout time you will be able to add and choose different credit cards. You can also update your credit cards anytime at http://quickcheckout.aol.com or AOL keyword: Quick Checkout<br><br>You must be the credit card holder or authorized user of a credit card to register for Quick Checkout. |

*FIG. 1*

② Enter your shipping information.

☑ If you would like to use your credit card address for shipping, check this box and skip to the next step.

First Name and Middle Initial [          ]
Last Name [          ]
Address Line 1 [          ]
Address Line 2 (optional) [          ]
Address Line 3 (optional) [          ]
City [          ]
State [AA - Armed Forces Americas ▼]
Zip/Postal [          ]
Country [United States ▼]
Daytime Phone [          ]
(e.g. 888-888-8888)
Evening phone (optional) [          ]
(e.g. 888-888-8888)

Remember
As with your credit cards you can add and choose different addresses at checkout time. And you can also update your addresses anytime at http://quickcheckout.aol.com or AOL Keyword: Quick Checkout.

CLIENT-SIDE FORM FILLER THAT POPULATES FORM FIELDS BASED ON ANALYZING VISIBLE FIELD LABELS AND VISIBLE DISPLAY FORMAT HINTS WITHOUT PREVIOUS EXAMINATION OR MAPPING OF THE FORM

CROSS REFERENCE TO RELATED APPLICATION

This application is a Continuation-in-Part of U.S. patent application Ser. No. 09/561,449, filed on Apr. 28, 2000.

BACKGROUND OF THE INVENTION

1. Field of the Invention

The invention relates to electronic form mapping and recognition. More particularly, the invention relates to an automated client-based method of filling out electronic forms that does not require any prior mapping or examination of the forms.

2. Description of Related Technology

Internet users are only too familiar with the repetitive chore of filling out online forms. Many websites limit full access to registered accountholders. Registration may require providing personal data by way of entering the data into the fields of an HTML form. Return visits to such sites generally require a sign-on procedure in which the user is asked to provide, for example, a user name and password. E-commerce applications require the user to fill in order forms that ask for personal data, billing address, shipping address, credit card information and such. Often, users, when faced with a request to complete yet another form, just move on because they simply don't want to take the time to complete the form. Thus, filling out online forms, while essential, also constitutes a serious obstacle for the site sponsor and the user alike. The user is deprived of what may be an important source of value, and the site sponsor may lose sales, or at the very least, may miss important opportunities to find out more about the people who visit their site. Thus, it would be an important advantage to provide a system that automated the task of filling out electronic forms.

The parent to the current application, J. Rawat, S. Palnitkar, Method and system of implementing recorded data for automating Internet interactions, U.S. patent application Ser. No. 09/561,449, filed Apr. 28, 2000 provides just such a system. User information is maintained in a central database. The user information includes personal data as well as account-specific data, such as the URL, and the login data for sites the user has visited. Client-side program code, integrated with a conventional web browser provides a utility window through which the user may access the central database—to edit user information, for example. In addition to the database of user information, the system also maintains a database of form information wherein mapping information is stored for forms from previously visited web sites. The forms are mapped by parsing the underlying code, typically HTML, of the form, for example, the field tags. When a mapped from is subsequently encountered, the map allows the form fields to be automatically populated with the required user data in the required format. Occasionally, for example, in the case of optional fields or forms that have changed slightly so that the saved map is no longer completely accurate, user intervention may be required.

The prior art provides several examples of network based or distributed electronic wallets, in which user information is stored in a database for later use. D. Schutzer, System and method for use of distributed electronic wallets, European Patent Application No. EP1077419, published Feb. 21, 2001 describes a method and system in which two electronic wallets communicate and exchange information; typically a consumer's electronic wallet populates a merchant's wallet with the consumer's personal data. The merchant wallet stores the consumer's personal data for later use. M. Bahdur, G. Huddleston, C. Paltenghe, M. Takata, Distributed network based electronic wallet, European Patent Application No's. EP0917119 and EP0917120, filed May 19, 1999 provide a system in which various classes of user data are stored in distributed databases; the user may download the stored data to a wallet application. M. Sivadas, D. Steed, J. Main, Server-based electronic wallet system, European Patent Application No.

EP1168264, filed Jan. 2, 2002 describes system in which purchase requests directed to a merchant server from a wireless device are mediated by one or both of a proxy server and a wallet server. The .NET PASSPORT SERVICE, provided by Microsoft Corporation of Redmond Wash., includes a service wherein the user may use a single sign-in and make express purchases from participating merchants and web sites. A wallet application allows the user to store personal data on a secure server, such as billing and shipping addresses and credit card data. When the user makes a purchase from a participating merchant, the user data is automatically supplied to the merchant from the secure server. In all of these previous examples from the prior art, a distributed, or client-server architecture is essential to the proper function of the system. None of the systems described contemplate an exclusively client-based form-filler that is capable of populating any web-based form with user data.

A. Gupta, A. Rajaraman, Method and system for automatically filling in forms in an integrated network based transaction environment, U.S. Pat. No. 6,199,079, filed Mar. 20, 1998 describes a method of automatically filling in online forms presented by web pages, in which a particular form is assigned a unique identifier and a template for the form is stored in a database of form templates, indexed by forms' unique identifiers. When the user encounters a form, the form is filled in according to that form's template from the database. R. Haridas, M. Markus, Method and apparatus for completion of fields on Internet page forms, International Application No. PCT/US00/41802, filed on Nov. 2, 2000 describes an automated method for completion of Internet webpage forms in which user data stored on a centralized server is automatically applied to forms that have been previously registered with the centralized server. Thus, both of these examples from the prior art employ a distributed architecture and derive their form-filling capability from a record of the form stored at a central location. Neither contemplates the ability to analyze any form encountered and populate the form fields with the required user data in the proper display format without any prior mapping or examination. J. Light, J. Garney, Automatic web based form fill-in, U.S. Pat. No. 6,192,380, filed on Mar. 31, 1998, describes an automated form filler that recognizes a form within an HTML page and fills in the form fields with data taken from a database. Recognition of the form and the form fields occurs by parsing the page's HTML code and identifying page tags and field tags.

M. Pennell, A. Martin, Method and apparatus for automatic form filling, International Application No. PCT/US0042073, filed on Nov. 9, 2000 describes a software application intended for use with or integration into a conventional web browser application that automatically populates the fields of a web-based form with the required user data. The described software application gains knowledge of the form's fields and the expected contents by analyzing the underlying code for the page received by the browser from the visited web site, generally HTML or XML code, or the like. Embodiments of the software application in both distributed and client-based implementations are described.

The Roboform user manual, ©1999–2002, updated Jan. 25, 2002, describes a client-based web form filler that works as an add-on to conventional web browser applications. Forms may be filled in either by means of a "pass card," a record that saves information related to a specific form at a particular web site, or by means of an "identity," a user profile, wherein the software application analyzes the page encoding and populates the form fields with appropriate data from the identity. By the user selecting a country, the application applies the appropriate display format to form data such as dates and telephone numbers.

All of the above form-fillers analyze a web form based on the form's underlying code. There is no indication that they analyze a form based on page elements visible to the user on the rendered page, such as field labels. While the Roboform application is able to format data according to a user-selected country format, there is no indication that either Roboform or the form-filler described by Pennell, et al. can format data on an ad hoc basis by analyzing user-visible formatting prompts, generally provided somewhere adjacent the field.

While parsing html field tags provides generally satisfactory results, the lack of any naming convention for the fields of an HTML form has made it impractical to devise a completely automated form-filler. It is difficult for systems that parse a page's underlying code to identify fields to accommodate the limitless variety typically encountered in field names, without at least some user intervention. The adoption of standardized markup languages such as ECML (E-commerce markup language) may help to remedy this situation. In the meantime, there exist multitudes of forms that do not follow any sort of naming convention for the fields. On the other hand, field labels, the visual page elements that communicate a field's purpose to the user display a great deal more uniformity than the underlying field names.

Accordingly, it would be a great advantage to provide an intelligent, fully automated, client-based form filler that maps the fields of an electronic form by parsing visual page elements, such as the user-visible field labels. It would also be desirable to provide the functionality of determining the appropriate contents for a field based on the field's context, the type of neighboring fields to the target field. Furthermore, it would be a significant technical advance to provide the capability of formatting the appropriate data according to visible formatting prompts.

SUMMARY OF THE INVENTION

In recognition of the above needs, the invention provides an intelligent form-filler that does not require any prior mapping or examination of the forms. Client-side program code examines electronic documents such as web pages and automatically fills in fields of forms contained in the document with the appropriate data from a user profile, without requiring prior mapping or examination of the form. The application maps user data to the appropriate form field by examining field label text on the form as the user sees it, i.e. text that is visually nearest the field. For fields lacking labels, the application evaluates the field context by determining the field type of neighboring fields to determine the required data. To enter the information in the correct format, the application parses visual hints concerning, for example, the date format provided to the user and formats the data accordingly. In the complete absence of any usable visual cues or contextual information, the program code is capable of parsing the form's underlying code. Alternate embodiments of the invention are possible, in which that user information is alternately stored on the client, or on a server, to maximize portability.

DESCRIPTION OF THE INVENTION

Figure 1:
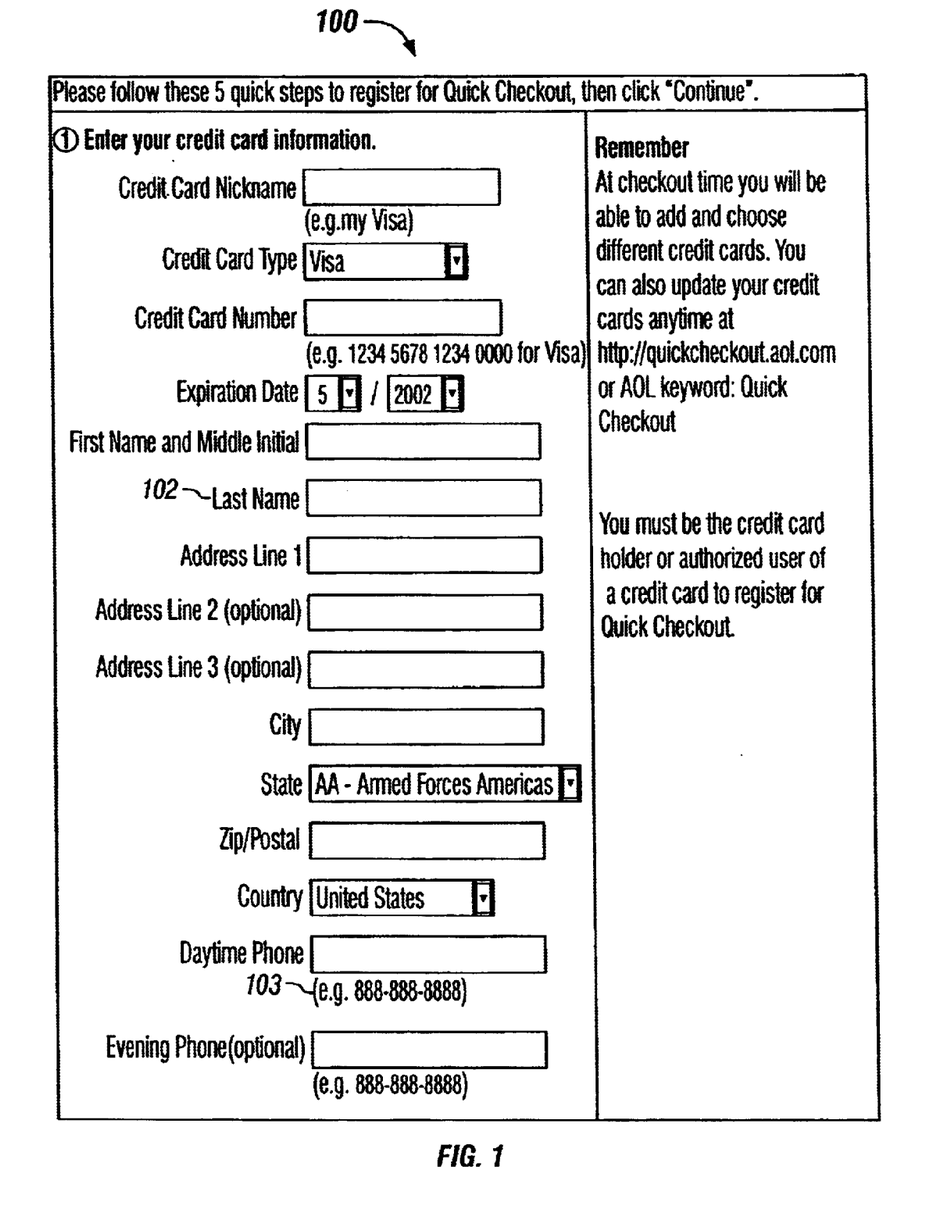
FIG. 1 provides a screen shot of a typical web-based electronic form.

As shown in FIG. 1, a typical HTML form 100 includes a plurality of fields 101 that must be filled out by the user, for example, when making an online purchase, or registering at a web site. Form-filling software generally analyzes the fields 101 of the form and maps them to the correct user data by parsing the HTML field names, commonly known as field tags (not shown) and then supplying the correct user data from a stored user profile, generally located on a remote server. Because no naming convention has existed for fields in an HTML form, it has been difficult to produce a fully automated form-filler application. Previously, forms had to be mapped or analyzed in advance and the mapping saved in a database of form descriptions, usually also located on a remote server. Often, user intervention is required to complete the form.

HTML forms also include a plurality of visible field labels 102, in which each label is spatially and visually related to its corresponding field, although no programmatic relationship usually exists between them, as with the HTML field tags. The field labels are provided for the user's benefit to advise them of the correct information to enter into a particular field. The invention recognizes that there exists a great deal more uniformity and consistency among the visible field labels than to the underlying field names, because the labels generally identify the information sought in a well-known, highly conventional manner. Based on such recognition, the invention provides a client-based system and method for filling out electronic forms automatically, in which the fields of an HTML form are identified and mapped to the correct user data based on visible form elements such as field labels. Following mapping and identification, the fields of the form are populated with the correct user data, without reference to a previous, stored mapping or analysis of the form, and without requiring user intervention.

Figure 2:
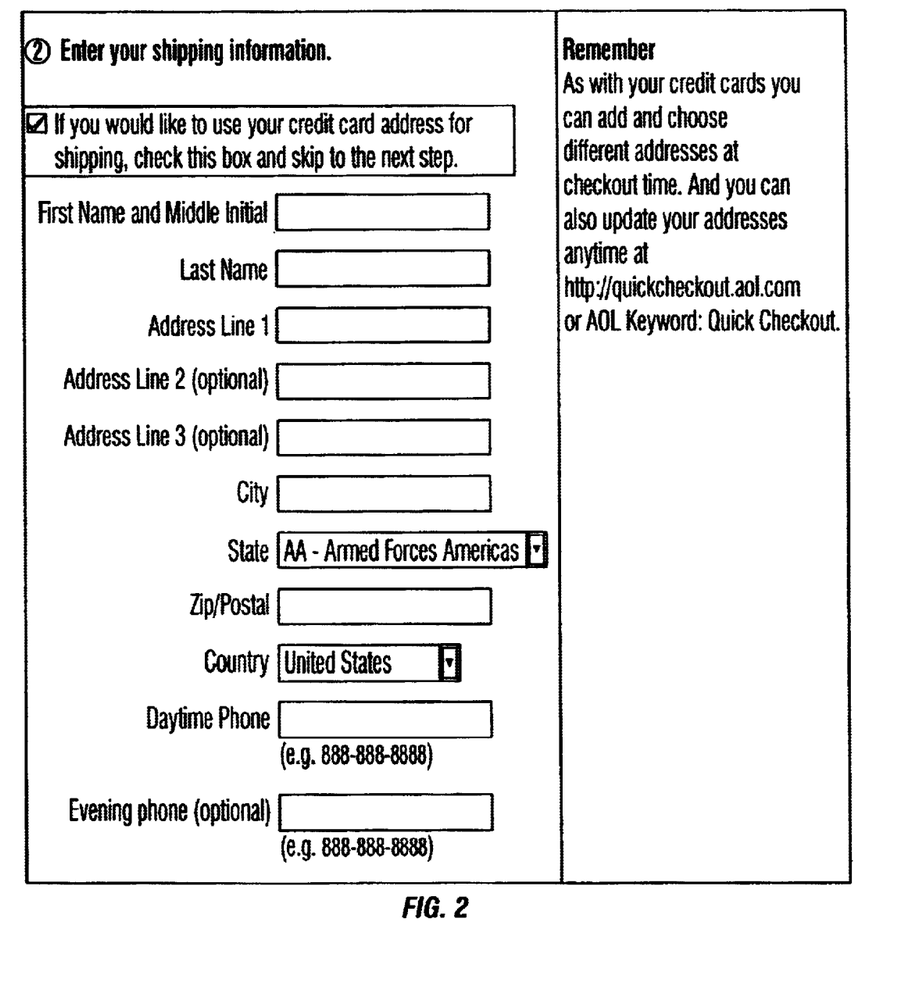
FIG. 2 provides a second view of the form of FIG. 1.
Figure 3:
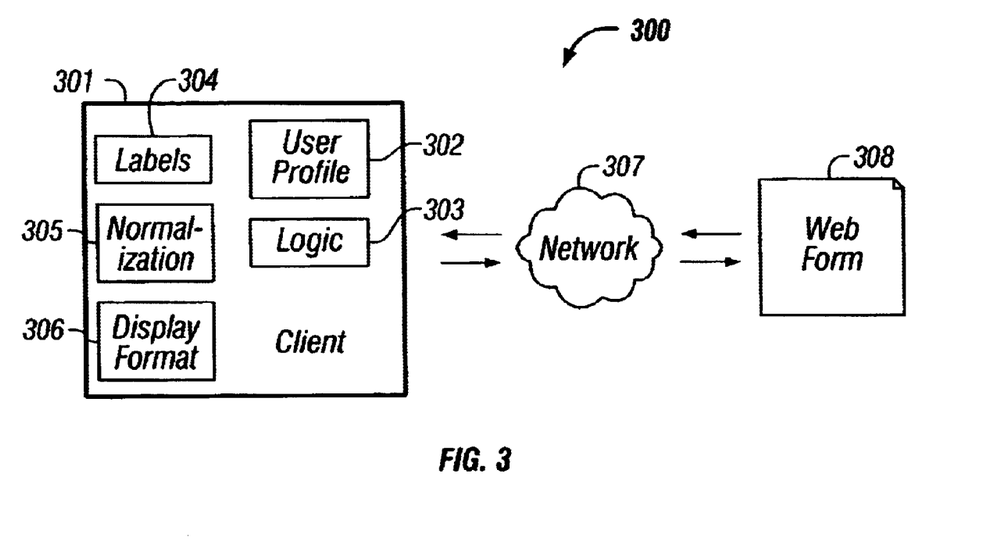
FIG. 3 provides a schematic diagram of a client-based system for filling out electronic forms according to the invention.

Turning now to FIG. 3, a schematic diagram of the system of the invention is shown. A client 301, in communication with a network 307, retrieves an HTML page containing a web form 308 from a remote site on the network. The web form could be substantially similar to the typical form shown by FIGS. 1 and 2. In one embodiment of the invention, the client 301 is a conventional microcomputer, either desktop or laptop. However, other clients possessing the requisite storage capacity and processing capability are entirely consistent with the spirit and scope of the invention. A client may also be a process, such as a program, that requests a service from another process. In one embodiment of the invention, the client communicates with a publicly accessible HTTP network such as the Internet, however other network environments employing other networking protocols are also suitable for the invention. The means of connecting to the network includes dialup and broadband connections, as well as other connection methods, such as wireless.

As previously stated, the client 301 has both storage capacity and processing capability. Logic 303 stored and executed on the client implements a probabilistic, rule-based method of analyzing the form in separate steps. In a first step, the logic traverses the form from beginning to end, locating the field labels, associating them with a field, and then mapping the field to the correct metadata based on a best match from a field label dictionary 304—a file of analogs, or expressions resembling the field label, stored on the client 301. Also incorporated in the field label dictionary are the rules for mapping the field to the correct metadata and for mapping fields lacking labels to the correct metadata based on the field's context. At the same time, the functional blocks of the form are identified, for example, shipping address and billing address. In this way, identical field labels, such as "address" or "zip code" in a shipping address block and a billing address block are mapped to the correct metadata.

In a second step, the logic traverses the form elements in a reverse direction, refining the granularity of the mapping done in the first pass, based on rules contained in a normalization dictionary 305, also stored on the client. The logic traverses the form a third time, identifying visible display format hints 103, mapping them to a display format dictionary 306, also stored on the client. Similar to the field labels dictionary 304, the display format dictionary 306 contains a number of regular expressions that are analogs of, or similar to the visible display format hints 103 found on the form 100. Additionally, the display format dictionary 306 contains rules and code for mapping the field to the correct display format. Finally, after the visible elements of the form have been completely mapped the correct user data is retrieved from a stored user profile 302, a data file stored on the client, and concatenated, truncated or re-formatted as required by the display format, and the form fields are populated with the data. In an alternate embodiment, the user profile is stored on a server and retrieved by the client.

Figure 4:
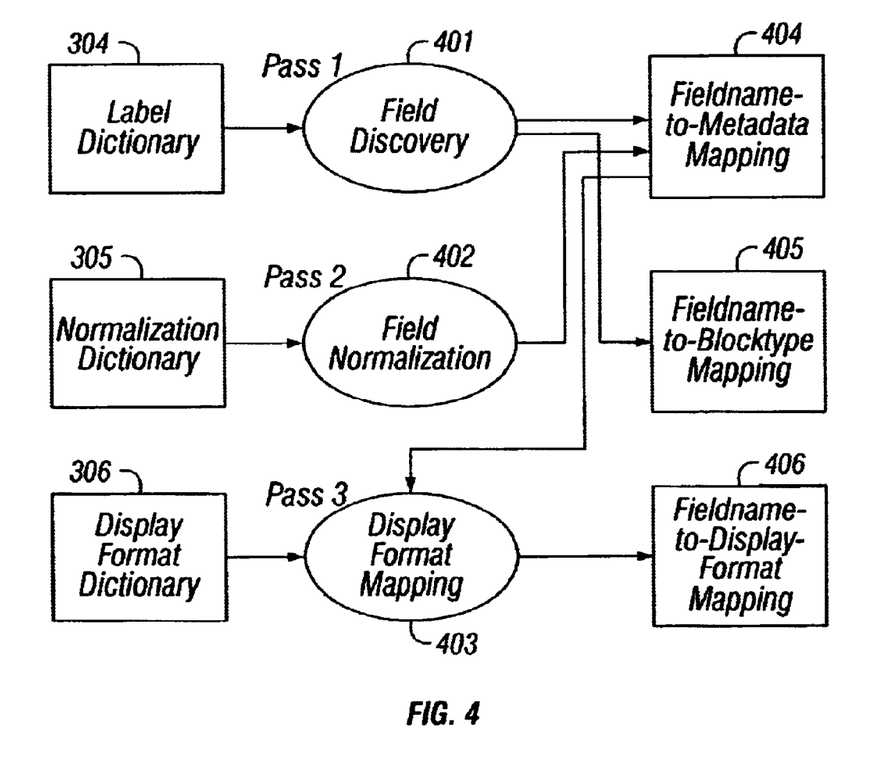
FIG. 4 provides a data flow diagram of a client-based method for filling out electronic forms according to the invention.

FIG. 4 provides a data flow diagram of the method of the invention 400. In a preferred embodiment, the method is implemented as a JAVASCRIPT function that analyzes forms in a target window and maps each identified form element to the correct user data to be filled into each field. Conventional techniques of computer programming are employed in the implementation of the invention. In addition to JAVASCRIPT, other commonly known scripting and programming languages would also be suitable for the invention such as VBSCRIPT, PERL, JAVA, or JPYTHON. As previously indicated, the invention primarily relies on the visible field label. However, in the absence of a visible field label, the invention also utilizes:

HTML or ECML field name;

Default field value, in the case of a field that is a select box;

A list of possible values for radio buttons; or

Previous field mapping

The invention matches the values with the dictionaries previously described to map the fields to metadata, wherein metadata comprises a data type, such as Last name;

First name;

AddressLine 1;

AddressLine 2; and

City.

As will be apparent to the practitioner of ordinary skill, the above metadata classifications are exemplary only. Others will occur to the artisan according to the setting and the functional requirements.

As shown in FIGS. 3 and 4, the domain-specific data contained in the dictionaries has been kept separate from the processing logic. Thus, the invention is easily modified by substituting dictionaries to support forms written in any language. Furthermore, the mapping and normalization rules are also easily modified to accommodate a variety of settings and applications of use.

Referring again to FIG. 4, the core method involves the following steps, each of the steps accomplished in a single traversal of the form elements:

First, field discovery 401;

Second, field normalization 402; and

Display format mapping 403.

On the first traversal: The logic loops forward over all form elements and discovers the fields. The primary method of field discovery involves, for an unmapped field, analysis of the visible field label. A number of rule-based approaches to the field label analysis are possible. Among them:

if a field is positioned in a table cell, analyzing text expressions in adjacent cells; and comparing the analyzed text expressions with entries in the field label dictionary to find the closest match with a metadata expression, wherein the field is mapped to the correct metadata. As FIG. 1 and 2 show, the field label is typically situated to the left, or immediately above the field. However, according to need, the rules may be varied, to accommodate a placement below or to the right of the field;

analyzing text expressions that occur within a predetermined number of words and within predetermined direction and distances from the field;

based on page coordinates, examining the general vicinity of the form in all directions from the field and analyzing the text expression closest to the field; and ignoring supplemental text that does not contribute to the field label while searching for the field label, for example, text within parentheses or quotation marks.

After the field label is located according to one of the above procedures, the analyzed expression is compared with a listing of similar expressions in the field label dictionary to find the closest match. The dictionary expressions, analogs of the analyzed expression, are organized according to metadata. Thus, when a match is found, the field corresponding to the field label is mapped to that metadata 404.

There may be cases when a field doesn't have a label. For example, two or three fields may be provided for street address. Often they are labeled "Address 1" and "Address 2," or something similar. But the first field may only be labeled "Address" and the second address field may not bear a label at all. In such a case, it is possible to map the second field according to its context. Mapping according to context requires that the field immediately preceding the field of interest have been mapped. As fields are mapped during the first pass, the algorithm assumes maximum granularity of the data. Thus, in the case of an unlabeled field that follows a field labeled 'address;' the 'address' field would have been mapped to the metadata "AddressLine 1." It is probable that an unlabeled field following a "AddressLine 1" field is an "AddressLine 2" field. Accordingly, the unlabeled field will be mapped to the metadata "AddressLine 2."

As stated above, the algorithm assumes maximum granularity of the data. Thus, an unlabeled field following an "area code" field is assumed to be a "prefix" field, rather than a field asking for the entire remainder of the telephone number. A field labeled 'Address' is presumed to be an "AddressLine 1" field, rather than a field that asks for the entire street address. As described further below, during normalization, the granularity of the field mapping is refined.

Additionally, if a field lacks a label, the algorithm may analyze the field's programmatic name. Following field name analysis, the field name is compared to the entries in the Field label dictionary and a match found. The field is then mapped as described above.

Furthermore, field size can be used to resolve ambiguity. For example, in the scenario "Name: First [ ] Middle [ ] Last [ ]," it may be unclear whether the form is asking for the middle name or middle initial. Considering the size of the form element would help to resolve the ambiguity in this case: size=1 implies middle initial else middle name.

In the case of select boxes, if the field lacks a label the algorithm uses the default value for comparison with the field label dictionary followed by mapping as described above. Typically, in such cases, the default value acts as the label, e.g. "Select a state."

Sets of radio buttons are completely separate objects in the DOM (document object model) of the page. Thus, the logic creates a Radiobutton object. The list of possible values is compared to the field label dictionary and a mapping performed as described above.

Identifying the Block Type

Also, during the first traversal of the form elements, the fields are mapped to a block type 405. A block is a functional unit of the form, such as:

billing address;
shipping address;
email address; and
credit card information.

The block type mapping for most fields is reasonably obvious: an email address is mapped to email, a credit card number is mapped to the credit card block. However, in the case of shipping address and mailing address, the mapping is more complex. Both block types contain identical field labels, although the underlying field names are different. FIGS. 1 and 2 show different blocks of the same form, with FIG. 1 showing a billing address block and FIG. 2 showing a shipping address block.

Thus, when a Name, Address or Phone field is encountered, the block type may be either BILLING or SHIPPING. A new block is assumed to start when an AddressLine 1, NameTitle, FirstName or LastName field is found; and the previous field was not a Name field. To identify whether the block is BILLING or SHIPPING, first the HTML fieldname is analyzed. If it matches any of the expressions in either a billing address array or a shipping address array, the block is mapped to BILLING or SHIPPING respectively.

If it isn't possible to map using the field name, the visible text preceding this field (and up to the previous Country or AddressLine 1 field, if any, is analyzed. If this text contains any of the expressions in the billing address or shipping address array, the block is BILLING or SHIPPING respectively.

Often, the visual text is too large to analyze and may contain additional information such as the order summary or anchor labels, which may contain strings like "Shipping Information" or "Shipping Options," resulting in mapping to an incorrect block type. In such cases, the following strategy is able to pick out the block label more accurately. It is adapted specifically to cases in which the address block and its label are situated in a table:

1. Search the text from the start of the BODY of the HTML page (or from just after a previous AddressLine 1 or Country element, if any) to the position of the current element.
2. Get the table that the current element is in.
3. If there is no table, exit. (It isn't possible to narrow down the range of text to be searched.)
4. If the start of table is before start of the previously text searched as above in 1, exit. (It isn't possible to narrow down the range of text to be searched.)
5. Search the text from start of table to start of current element.
6. If any of the text searched matches with an expression in a billing address array or a shipping address array, the block type is determined.
7. Otherwise, if the current table is embedded in another table return to step 3.

During the second traversal of the form elements, the logic steps through the elements in reverse order, starting with the last field in the form. During this step, field normalization 402, the granularity of the field mapping is refined. For example as described above, assuming maximum granularity, a field labeled 'Address' was presumed to be the first line of two or more address lines, thus it was mapped to 'AddressLine 1.' However, the presumption that the form contains more than one address line may be incorrect. In the current step, such mapping errors can be resolved by examining a field's context in reverse order. Thus, in the case of the 'Address' field, if the field following the labeled address field is mapped to 'City' it is determined that the original mapping of the field to 'AddressLine 1' was incorrect, and the field can be mapped correctly.

In the case of a telephone number field, on the first pass, the first field, because maximum granularity is assumed, would have been mapped to area code. On the second pass, if the mapped field is immediately followed by another labeled field, the original mapping will be incorrect—since there is only one field for telephone, it will be necessary to concatenate the separate expressions for telephone number to create a single string to put into the single telephone field. If, however, the field mapped to area code is followed by two unlabeled fields and then a labeled field, the mapping of the first field to 'Area code' was correct, and the two additional unlabeled fields can be mapped to accept the other expressions that together make up an entire phone number, a three-digit prefix, followed by a four-digit prefix. The rules for evaluating the field contexts in this fashion are found in the normalization dictionary 305. While the invention has been described in terms of conventions followed in the United States, the practitioner of ordinary skill will appreciate that the invention can be adapted to those of any country.

On the third traversal, for fields that require the data to be entered in a specified format, the visible display format hints 103 are analyzed. Thus, in a display format-mapping step 403 the fields that have been mapped to a metadata category 404 are mapped to the correct display format 406.

The display format hints are organized by category, i.e. there is one set of display hints for Phone fields, another for Name fields, Date fields and so on. Display format hint text for the field is captured (The text could be either to the left or right of the field). As described above, supplemental text enclosed within parentheses or quotation marks is ignored for the purpose of identifying field labels. However, when identifying display format hints, priority is given to the supplemental text because the display format hints are more likely to be found in the supplemental text, embedded within parentheses or quotation marks. This text is matched against the expressions found within the display format dictionary 306 in the set of hints for the field category (Note that the field has already been identified, so the field category is known at this point), and the display format is identified. If no display format is obtained and the previous field category is the same as this field category, then the previous display format is applied to this field, too.

This would apply to cases like:

Home Phone (xxx-xxx-xxxx): ☐

Work Phone: ☐

Checkout Form Detection

The program code object has a flag, which is set whenever a Billing or Shipping Address field or a Credit Card field is identified to indicate the form is a checkout form. Thus, the invention also provides checkout form detection functionality.

Masked Fields

Certain INPUT elements, for example, credit card number fields are designated as password fields, so as to mask sensitive information from being displayed. The names of these fields are stored in a separate array. To provide added security, the field type can also be changed to password for certain fields, for example, a form may generally allow users to enter the credit card data in visible clear text. The field type can be programmatically changed to password before filling out the card number so that the data shows up as "*******" instead of clear text.

After the metadata, block type and display format of each field has been identified, the information is used to generate a form mapping. In the current embodiment of the invention, the form mapping is coded in XML (extensible markup language). However, other page description languages would also be suitable in the practice of the invention.

Following mapping, the appropriate user data is retrieved from the user profile data file, formatted as required by the newly generated page mapping and the fields of the form populated with the required data.

While the invention has been described with respect to e-commerce applications, such description has been for purposes of illustration only, and is not meant to limit the scope of the invention. The invention finds application with other types of forms as well. Additionally, the invention is also well suited to automating the login process at sites requiring a user login.

Although the invention has been described herein with reference to certain preferred embodiments, one skilled in the art will readily appreciate that other applications may be substituted for those set forth herein without departing from the spirit and scope of the present invention. Accordingly, the invention should only be limited by the claims included below.

What is claimed is:

1. A client-based method for filling out an electronic form automatically without previous form examination or storing of mapping information about said form, comprising the steps of:

identifying form fields based on analysis of visible field labels proximate said fields, when said visible field labels are present;

evaluating user visible display format hints proximate said fields to determine required display format;

mapping the electronic form based on said analysis; and populating form fields with correct data in correct format without user intervention, according to said mapping.

2. The method of claim 1, wherein said step of identifying fields based on analysis of visible field labels comprises:

traversing form elements in a first sequence.

3. The method of claim 2, wherein said step of identifying form fields based on analysis of visible field labels further comprises any of the steps of:

if a field is positioned in a table cell, analyzing text expressions in adjacent cells;

analyzing a text expression within a predetermined number of words and in at least one predetermined direction from said fields;

based on form coordinates, examining general vicinity of said form in all directions from the field and analyzing text expression closest to said field; and disregarding text expressions embedded within parentheses or quotation marks.

4. The method of claim 3, wherein said step of identifying fields based on analysis of visible field labels further comprises the step of:

comparing the analyzed text expressions with entries in a field label dictionary to find closest match with a metadata expression, wherein said field is mapped to correct metadata.

5. The method of claim 2, further comprising the step of:

when a field lacks a visible field label, mapping the field according to context.

6. The method of claim 5, wherein mapping the field according to context comprises:

identifying mapping of at least one field preceding a current field in said first sequence; and mapping said current field based on said mapping of said preceding field.

7. The method of claim 2, further comprising the step of:

when a field lacks a visible field label, mapping the field based on analysis of a programmatic field name.

8. The method of claim 2, further comprising the step of:

when a field lacks a visible field label, comparing the field's default value with entries in a field label dictionary to find closest match with a metadata expression, wherein said field is mapped to correct metadata.

9. The method of claim 2, further comprising the step of:

if a field is a select field, comparing selection options with entries in a field label dictionary to find closest match with a metadata expression, wherein said field is mapped to correct metadata.

10. The method of claim 2, further comprising the step of:
for sets of radio buttons, creating a new object for each set.

11. The method of claim 2, further comprising the step of:
identifying block type, wherein a block comprises a plurality of related fields.

12. The method of claim 11, wherein the step of identifying block type comprises one of the steps of:
comparing programmatic field name of at least a current field with arrays of metadata expressions for each block type;
comparing visible form elements for at least said current field with arrays of metadata expressions for each block type; and
when said current field occupies a table cell, analyzing text expressions at least from first cell of said table to cell occupied by said current field.

13. The method of claim 12, said step of identifying block type further comprising the step of:
when a close match is found, mapping said field to said block type.

14. The method of claim 11, wherein block type includes any of:
billing address;
shipping address;
credit card information; and
email address.

15. The method of claim 2, further comprising the step of:
traversing form elements in a second sequence, said second sequence a reverse of a first sequence;
identifying mapping of at least a field following a current field in said second sequence; and
mapping said current field based on said mapping of said field following the current field.

16. The method of claim 1, wherein said step of evaluating visible display format hints proximate said fields to determine required display format comprises the steps of:
traversing form elements in a first sequence;
analyzing a visible display format hint proximate a field;
comparing said analyzed display format hint with a dictionary of data-entry prompts;
mapping said field to a display format based on said comparison.

17. The method of claim 16, further comprising the step of:
any of concatenating, truncating and re-formatting said correct data according to said display format.

18. The method of claim 16, further comprising the step of:
for a field lacking a proximate visible display format hint, mapping current field to same display format of a preceding field if both fields are the same field type.

19. The method of claim 1, further comprising the step of:
identifying a form as a checkout form.

20. The method of claim 1, further comprising the step of:
masking confidential data from being displayed.

21. A computer program product for filling out an electronic form automatically without previous form examination or storing of mapping information about said form, said computer program product comprising a tangible medium having computer readable code embodied therein, the computer code including program code means for:
identifying form fields based on analysis of visible field labels proximate said fields, when said visible field labels are present;
evaluating user visible display format hints proximate said fields to determine required display format;
mapping the electronic form based on said analysis; and
populating form fields with correct data in correct format without user intervention, according to said mapping.

22. The computer program product of claim 21, wherein said code means for identifying fields based on analysis of visible field labels comprises code means for:
traversing form elements in a first sequence.

23. The computer program product of claim 22, wherein said code means for identifying form fields based on analysis of visible field labels further comprises code means for any of:
if a field is positioned in a table cell, analyzing text expressions in adjacent cells;
analyzing a text expression within a predetermined number of words and in at least one predetermined direction from said fields;
based on form coordinates, examining general vicinity of said form in all directions from the field and analyzing text expression closest to said field; and
disregarding text expressions embedded within parentheses or quotation marks.

24. The computer program product of claim 23, wherein said code means for identifying fields based on analysis of visible field labels further comprises code means for:
comparing the analyzed text expressions with entries in a field label dictionary to find closest match with a metadata expression, wherein said field is mapped to correct metadata.

25. The computer program product of claim 22, further comprising code means for:
when a field lacks a visible field label, mapping the field according to context.

26. The computer program product of claim 25, wherein said code means for mapping the field according to context comprises code means for:
identifying mapping of at least one field preceding a current field in said first sequence; and
mapping said current field based on said mapping of said preceding field.

27. The computer program product of claim 22, further comprising code means for:
when a field lacks a visible field label, mapping the field based on analysis of a programmatic field name.

28. The computer program product of claim 22, further comprising code means for:
when a field lacks a visible field label, comparing the field's default value with entries in a field label dictionary to find closest match with a metadata expression, wherein said field is mapped to correct metadata.

29. The computer program product of claim 22, further comprising code means for:
if a field is a select field, comparing selection options with entries in a field label dictionary to find closest match with a metadata expression, wherein said field is mapped to correct metadata.

30. The computer program product of claim 22, further comprising code means for:
for sets of radio buttons, creating a new object for each set.

31. The computer program product of claim 22, further comprising code means for:
identifying block type, wherein a block comprises a plurality of related fields.

32. The computer program product of claim 31, wherein the code means for identifying block type comprises code means for:
  comparing programmatic field name of at least a current field with arrays of metadata expressions for each block type;
  comparing visible form elements for at least said current field with arrays of metadata expressions for each block type; and
  when said current field occupies a table cell, analyzing text expressions at least from first cell of said table to cell occupied by said current field.

33. The computer program product of claim 32, wherein the code means for identifying block type further comprises code means for:
  when a close match is found, mapping said field to said block type.

34. The computer program product of claim 31, wherein block type includes any of:
  billing address;
  shipping address;
  credit card information; and
  email address.

35. The computer program product of claim 22, further comprising code means for:
  traversing form elements in a second sequence, said second sequence a reverse of a first sequence;
  identifying mapping of at least a field following a current field in said second sequence; and
  mapping said current field based on said mapping of said field following the current field.

36. The computer program product of claim 21, wherein said code means for evaluating visible display format hints proximate said fields to determine required display format comprises code means for:
  traversing form elements in a first sequence;
  analyzing a visible display format hint proximate a field;
  comparing said analyzed display format hint with a dictionary of data-entry prompts;
  mapping said field to a display format based on said comparison.

37. The computer program product of 36, further comprising the code means for:
  any of concatenating, truncating and re-formatting said correct data according to said display format.

38. The computer program product of claim 36, further comprising code means for:
  for a field lacking a proximate visible display format hint, mapping current field to same display format of a preceding field if both fields are the same field type.

39. The computer program product of claim 21, further comprising code means for:
  identifying a form as a checkout form.

40. The computer program product of claim 21, further comprising code means for:
  masking confidential data from being displayed.

41. A client-based system for filling out an electronic form automatically without previous form examination or storing of mapping information about said form, comprising:
  a client;
  at least one data file;
  rules for mapping visible form elements to correct data from said file; and
  computer-readable code means for:
    identifying form fields based on analysis of visible field labels proximate said fields, when said visible field labels are present;
    evaluating user visible display format hints proximate said fields to determine required display format;
    mapping the electronic form based on said analysis; and
    populating form fields with correct data in correct format without user intervention, according to said mapping;
  wherein said code means are executable on said client, and wherein said rules, and said code means are stored on said client.

42. The system of claim 41, wherein said code means for identifying fields based on analysis of visible field labels comprises code means for:
  traversing form elements in a first sequence.

43. The system of claim 42, wherein said code means for identifying form fields based on analysis of visible field labels further comprises code means for any of:
  if a field is positioned in a table cell, analyzing text expressions in adjacent cells;
  analyzing a text expression within a predetermined number of words and in at least one predetermined direction from said field;
  based on form coordinates, examining general vicinity of said form in all directions from the field and analyzing text expression closest to said field; and
  disregarding text expressions embedded within parentheses or quotation marks.

44. The system of claim 43, wherein said code means for identifying fields based on analysis of visible field labels further comprises code means for:
  comparing the analyzed text expressions with entries in a field label dictionary to find closest match with a metadata expression, wherein said field is mapped to correct metadata.

45. The system of claim 42, further comprising code means for:
  when a field lacks a visible field label, mapping the field according to context.

46. The system of claim 45, wherein said code means for mapping the field according to context comprises code means for:
  identifying mapping of at least one field preceding a current field in said first sequence; and
  mapping said current field based on said mapping of said preceding field.

47. The system of claim 42, further comprising code means for:
  when a field lacks a visible field label, mapping the field based on analysis of a programmatic field name.

48. The system of claim 42, further comprising code means for:
  when a field lacks a visible field label, comparing the field's default value with entries in a field label dictionary to find closest match with a metadata expression, wherein said field is mapped to correct metadata.

49. The system of claim 42, further comprising code means for:
  if a field is a select field, comparing selection options with entries in a field label dictionary to find closest match with a metadata expression, wherein said field is mapped to correct metadata.

50. The system of claim 42, further comprising code means for:

for sets of radio buttons, creating a new object for each set.

51. The system of claim 42, further comprising code means for:

identifying block type, wherein a block comprises a plurality of related fields.

52. The system of claim 51, wherein the code means for identifying block type comprises code means for:

comparing programmatic field name of at least a current field with arrays of metadata expressions for each block type;

comparing visible form elements for at least said current field with arrays of metadata expressions for each block type; and when said current field occupies a table cell, analyzing text expressions at least from first cell of said table to cell occupied by said current field.

53. The system of claim 52, wherein the code means for identifying block type further comprises code means for:

when a close match is found, mapping said field to said block type.

54. The system of claim 51, wherein block type includes any of:

billing address;

shipping address;

credit card information; and email address.

55. The system claim 42, further comprising code means for:

traversing form elements in a second sequence, said second sequence a reverse of a first sequence;

identifying mapping of at least a field following a current field in said second sequence; and mapping said current field based on said mapping of said field following the current field.

56. The system of claim 41, wherein said code means for evaluating visible display format hints proximate said fields to determine required display format comprises code means for:

traversing form elements in a first sequence;

analyzing a visible display format hint proximate a field;

comparing said analyzed display format hint with a dictionary of data-entry prompts;

mapping said field to a display format based on said comparison.

57. The system of 56, further comprising code means for:

any of concatenating, truncating and re-formatting said correct data according to said display format.

58. The system of claim 56, further comprising code means for:

for a field lacking a proximate visible display format hint, mapping current field to same display format of a preceding field if both fields are the same field type.

59. The system of claim 41, further comprising code means for:

identifying a form as a checkout form.

60. The system of claim 41, further comprising code means for:

masking confidential data from being displayed.

61. The system of claim 41, wherein said data file resides on said client or on a server.

* * * * *